March 15, 1938. J. F. KOPSA Re. 20,672

REFRIGERATING SYSTEM

Original Filed Sept. 22, 1932

Inventor
Julius F. Kopsa
Fred Gerlach
his Atty.

Reissued Mar. 15, 1938

Re. 20,672

UNITED STATES PATENT OFFICE 20,672

REFRIGERATING SYSTEM

Julius F. Kopsa, Chicago, Ill., assignor to Kopolator Corporation, Chicago, Ill., a corporation of Illinois Original No. 2,002,033, dated May 21, 1935, Serial No. 634,278, September 22, 1932. Application for reissue May 17, 1937, Serial No. 143,137

10 Claims. (Cl. 62—115)

The present invention relates generally to refrigerating systems. More particularly, the invention relates to mechanical refrigerating systems of the type wherein a refrigerant, such as ammonia or like gas, is delivered in a compressed state from a motor-driven compressor to a condenser and from the condenser to an expansion valve, and after passing through the valve flows through an evaporating coil and thence back to the compressor.

In refrigerating systems of this type, it has been found that during operation, the oil which is used to lubricate the crank shaft and other operating parts of the compressor, gradually works its way into the compressor cylinder and is carried by the refrigerant through the expansion valve and into the evaporating coil where it congeals and, due to its gumminess, impairs the operation and reduces the efficiency of the system. In some instances, it has been found that so much of the oil works its way into the compressor cylinder that the oil remaining in the crank case of the compressor is not sufficient properly to lubricate the crank shaft and other operating parts, with the result that damage or faulty operation occurs.

One object of the invention is to provide a mechanical refrigerating system of the type under consideration which is an improvement upon, and more efficient in operation than, previously designed systems, in that it includes a centrifugal separator between the compressor and the condenser whereby any oil from the compressor is removed or disunited from the refrigerant prior to passage of the refrigerant to the evaporating coil in order to insure proper and efficient operation of the system and prevent dilution of the refrigerant and clogging of the expansion valve and the evaporating coil.

Another object of the invention is to provide a refrigerating system of the last mentioned character which contemplates simple means whereby the oil which is removed from the refrigerant by the centrifugal separator is automatically drained back into the crank case of the compressor so that proper lubrication of the crank shaft and operating parts of the compressor is at all times assured.

A further object of the invention is to provide a mechanical refrigerating system of the character last specified in which the means for automatically returning the separated oil from the centrifugal separator to the crank case of the compressor comprises a tank which receives the separated oil directly from the separator is connected to the separator so that it is subjected to the pressure of the refrigerant and embodies a float-controlled valve which is adapted to open when the oil in the tank reaches a predetermined level and permits the oil under the pressure of the refrigerant to drain back to the crank case of the compressor.

Other objects of the invention will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views.

Figure 1:
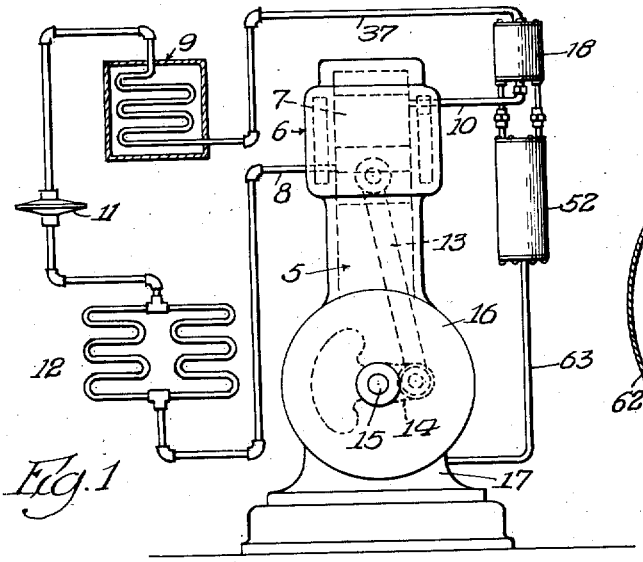
Figure 1 is a more or less diagrammatic view of a refrigerating system embodying the invention.
Figure 4:
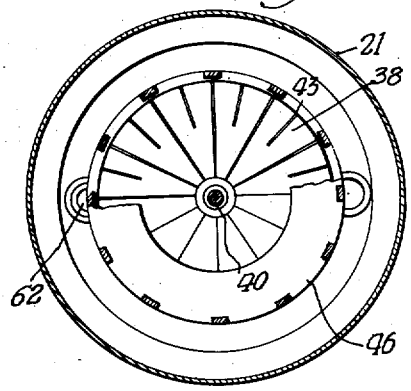
Figure 4 is a horizontal section on the line 4—4 of Figure 3.

The invention is exemplified in a mechanical refrigerating system which embodies a compressor 5. The latter serves to compress the refrigerant for the system and comprises a vertically extending cylinder 6 and a piston 7. The piston is slidably mounted in the cylinder and operates upon its down stroke to draw the refrigerant from the low side of the system through a pipe 8 into the cylinder, and upon the up stroke thereof to compress the refrigerant in the cylinder and force it to a condenser 9 through the medium of a pipe 10. From the condenser, the refrigerant passes through an expansion valve 11 into an evaporating coil 12 and thence back to the compressor via the pipe 8 in a manner well understood in the art. Back flow of the refrigerant through the pipes 8 and 10 is prevented by suitable check valves (not shown). The piston is reciprocated in the cylinder 6 for refrigerant compressing purposes, by means of a pitman 13 which is connected pivotally to, and extends between, the piston and a crank 14 on a crank shaft 15. The crank shaft 15 is provided at one end thereof with a pulley 16 whereby it is adapted to be driven by a belt or like instrumentality, and is journalled in a crank case 17 which is positioned beneath and is in the nature of a continuation of the cylinder 6. The crank case 17 is adapted to retain oil so as to lubricate the crank shaft, the pivotal connections between the pitman and the piston and the crank shaft and the inner periphery of the cylinder.

During operation of the compressor, the oil in the crank case 17 vaporizes to a small extent and continually works its way into the cylinder 6 where it unites with the refrigerant. In order to separate or disunite the oil from the refrigerant and thus prevent it from passing through the expansion valve into the evaporating coil where it is likely to congeal and impair the efficiency and operation of the system, a centrifugal separator 18 is provided. This separator is located between the compressor and the condenser and comprises a vertically extending, cylindrical casing 19 and a vertical series of rotatable deflectors 20. The casing 19 surrounds the series of rotatable deflectors 20 and consists of a cylindrical side wall 21, a circular bottom head 22 and a circular top head 23. The bottom head 22 serves as a closure for the bottom part of the casing and is secured to an inwardly extending flange 24 in the lower end of the side wall 21 by screws 25. The top head 23 rests on a ring 26 on an inwardly extending flange 27 at the upper end of the side wall 21 of the casing, and is secured in place by means of screws 28 which extend through the ring and into the aforementioned flange. The refrigerant in a compressed state is delivered into the casing of the separator by way of an inlet nipple 29. This nipple extends through a hole 30 in the central part of the bottom head 22 and embodies at the central portion thereof an integral, radially extending flange 31 which fits against the portion of the bottom head around the hole 30. A nut 32 is connected by a screw thread 33 to the lower end of the inlet nipple and serves to clamp the flange 31 against the bottom head so as to secure the inlet nipple in fixed relation with respect to the casing. The inlet nipple is connected to the pipe 10 by a union 34 and operates to direct the compressed refrigerant upwardly through the casing 19. The central portion of the top head 23 is shaped to form an upwardly extending outlet nipple 35. This nipple is connected to a pipe 37 which delivers the refrigerant to the condenser for passage to the expansion valve 11. The outlet nipple 35 is preferably of the same diameter as the inlet nipple 29 and is coaxial with the latter.

Figure 2:
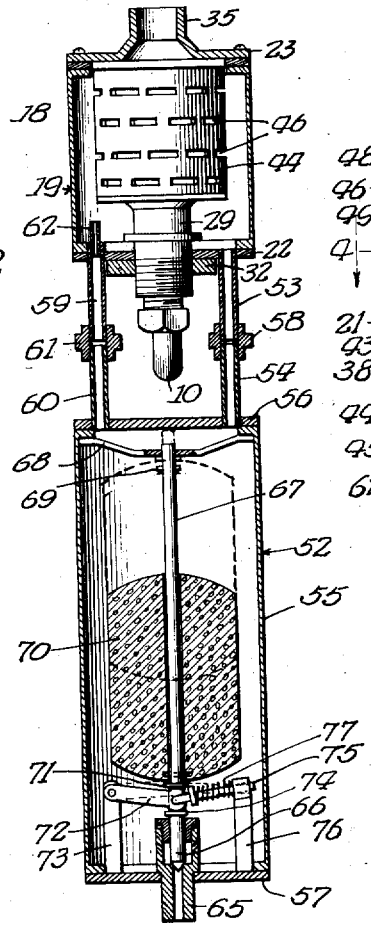
Figure 2 is a vertical section of the improved centrifugal separator for removing or disuniting oil from the refrigerant of the system and returning it to the crank case of the compressor.
Figure 3:
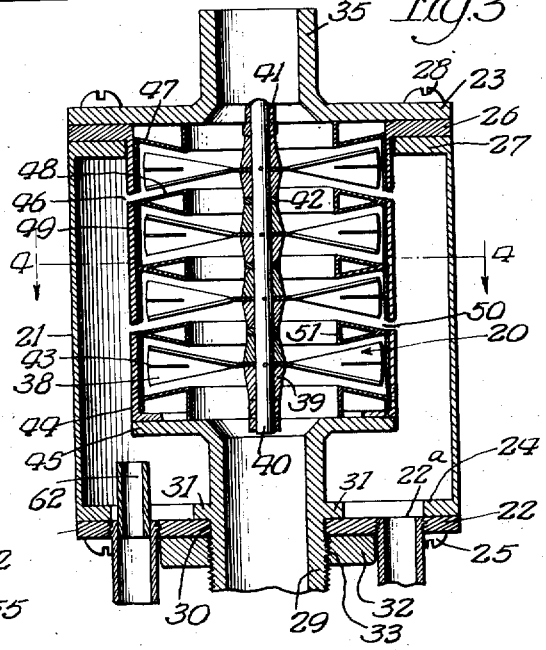
Figure 3 is an enlarged vertical section of the separator illustrating in detail the construction and arrangement of the various operating parts.

The deflectors 20 are formed of disks of sheet metal and are slit radially and bent so that they embody radially extending blades 38. They embody, in addition to the blades 38, hubs 39 and are mounted for horizontal rotation on a vertically extending shaft 40. The latter is longitudinally aligned with the inlet and outlet nipples 29 and 35 and is carried by a pair of bars 41 which are suitably mounted in the casing. The hubs 39 of the deflectors are journalled on the shaft 40 and are separated by washers 42. The compressed refrigerant, as it flows through the casing, impinges or strikes against the deflectors 20 and, because of the blades 38, causes the deflectors to rotate. This rotation of the deflectors results in any oil accompanying the refrigerant being thrown outwardly in the casing as the result of centrifugal action, and consequently the refrigerant passing to the condenser by way of the pipe 37 and from the condenser and expansion valve to the evaporating coil, is free from oil. In order to increase the efficiency of the deflectors, the central portions of the blades 38 are deflected to form radially extending ribs 43. The latter operate in a measure as baffles and guide the oil outwardly in the casing. The deflectors are preferably four in number. The blades of the bottom deflector and the one third from the bottom are twisted so that these two deflectors rotate in one direction. The blades of the deflector second from the bottom and the one at the top are oppositely twisted so that these two deflectors rotate in opposite directions. As a result of this construction, the refrigerant is subjected to the action of rotating deflectors, some of which rotate in one direction and others of which rotate in the opposite direction, with the result that any and all oil accompanying the refrigerant is effectively separated or disunited from the refrigerant prior to passage of the latter into the outlet nipple 35. A tubular sheet metal shell 44 surrounds the deflectors. This shell is spaced from the side wall 21 of the separator casing and extends between the top head 23 and a radially extending flange 45 at the upper end of the inlet nipple 29. An annular series of slots 46 is formed in the shell 44 adjacent each deflector 20. These slots allow the oil which has separated from the refrigerant to flow through the shell and to drop onto the bottom head 22 of the separator casing. The slots of each series are preferably staggered with respect to the slots of the adjacent series, as shown in Figure 2. In order to guide or direct the oil to the slots 46, a ring 47 is located above, and a ring 48 is located below each deflector. The rings 47 extend upwardly and outwardly and overlie the upper side edges of the blades 38. The rings 48 extend downwardly and outwardly and underlie the bottom side edges of the deflector blades and direct the oil in the direction of the slots 46. The rings 47 and 48 are supported at the outer edges thereof by spacers 49 which are positioned one on top of the other, as shown in Figure 3 of the drawing, and have slots 50 which register with the slots 46 in the shell 44. Tubular pieces 51 are soldered or otherwise secured to the inner edges of the rings 47 and 48 and form a conduit whereby the refrigerant is directed from the inlet nipple 29 to the outlet nipple 35.

The oil which is separated from the refrigerant and collects on the bottom head 22 of the separator casing is delivered to a tank 52 by way of a pair of pipe sections 53 and 54. The tank 52 is positioned directly beneath the separator casing 19 and comprises a cylindrical side wall 55, a circular top 56 and a circular bottom 57. The pipe section 53 extends through a hole 22a in the bottom head 22 and is connected to a pipe section 54 by a union 58. The pipe section 54 extends through the top of the tank 52 and in conjunction with the pipe section 53, forms a conduit through which the oil in the casing 19 flows into the tank 52. A pair of pipe sections 59 and 60 extend between the bottom head 22 of the separator casing and the top 56 of the tank and serve as a vent. These pipe sections are connected together by a union 61 and are located diagrammatically opposite the pipe sections 53 and 54. A tube 62 is secured in the upper end of the pipe section 59 and projects upwardly into the separator casing so as to prevent oil from clogging the sections 59 and 60. Due to the fact that the refrigerant passing through the separator casing is under pressure, the oil on the bottom head 22 of the casing is forced into the tank via the pipe sections 53 and 54. The tank is connected by a pipe 63 to return the oil to the crank case 17 of the compressor 5. This pipe is connected by a union 64 to an outlet nipple 65 which extends through the central portion of the bottom of the tank. Return of the oil to the crank case is controlled by means of a valve 66. This valve is vertically slidable in the upper end of the nipple 65 and is adapted when shifted upwardly to allow the oil to return to the crank case through the pipe 63, and when shifted downwardly, to close the nipple. The upper end of the valve is extended so as to form a stem 67. This stem is guided in a bracket 68 in the upper end of the tank and embodies a transversely extending pin 69 at its upper end. Opening and closing of the valve is accomplished by means of a float 70 which is slidably mounted on the stem 69. As the oil flows into the tank from the separator casing, the float 70 rises. When the float strikes the pin 69 at the upper end of the stem, the valve 66 is lifted into its open position and the oil in the tank is permitted to flow into the crank case 17. As the oil drains from the tank to the crank case, the float 70 moves downwardly on the stem 67 until it is arrested by an abutment 71 on the lower end of the stem. When the float engages the abutment, the weight of the float is applied to the valve with the result that the valve is shifted into its closed position. The abutment 71 is preferably located so that the valve 61 is closed by the float before all of the oil in the tank drains into the crank case, in order that the refrigerant is not allowed to escape into the crank case. In order to insure a proper opening and closing of the valve 66, a horizontally extending snap link 72 is provided. This link is pivotally connected to a vertical bracket 73 on the bottom 57 of the tank and extends between the abutment 71 and a shoulder 74. A horizontally extending stem 75 is slidably mounted in a vertical bracket 76 on the tank bottom 57 and is connected pivotally to the portion of the plate 72 which is disposed between the abutment and the shoulder. A spring 77 is applied to the stem and operates through the medium of the links 72 to snap the valve into and out of its closed position. When the link 72 is raised in response to upward shift of the stem 63 and opening of the valve 66, the spring 77 operates to snap the link upwardly as soon as it passes a truly horizontal position, with the result that the valve is quickly shifted into its open position and held in such position by spring pressure. When the link 72 is swung downwardly in response to downward movement of the stem 66 by the float, the spring 77 snaps the link downwardly as soon as it passes a dead center or truly horizontal position, and effects a quick closing of the valve. The float 70 exemplifies simple means for opening the valve 66 when the oil in the tank reaches a predetermined level.

The operation of the system is as follows:

When the compressor is operated by the application of power to the pulley 16, the piston 7 operates to draw the refrigerant in the system from the low side and to compress it in the cylinder 6. From the cylinder 6, the refrigerant in a compressed state and together with any oil that works its way into the cylinder from the compressor crank case 17, flows to the inlet nipple 29 of the centrifugal separator by way of the pipe 10. From the inlet nipple 29, the refrigerant flows upwardly through the shell 24 to the outlet nipple 23 from whence it flows or passes to the condenser via the pipe 37. As the refrigerant flows through the shell 38, the rotatable deflectors 20 are caused to rotate and operate by the centrifugal action of the blades 38 to disunite and throw outwardly the oil from the refrigerant. The oil so disunited from the refrigerant is directed to the slots 46 by the guide rings 48 and drops to the bottom head 22 of the separator casing from whence it drains into the tank 52 by way of the pipe sections 53 and 54. The refrigerant passing upwardly into the outlet nipple 35 is free from oil which, if allowed to pass or flow to the evaporating coil 12, would congeal and clog or impair the operation of the system. When the oil which is disunited from the refrigerant and drains into the tank 52 is sufficient in amount to raise the float 70 to a point at which it strikes against the pin 69 and raises the stem 67, the valve 66 is opened and allows the oil in the tank to drain back into the crank case of the compressor through the pipe 63. Passage or return of the oil to the crank case is facilitated by virtue of the fact that the tank is under the pressure of the refrigerant. When the oil level in the tank 52 drops to a point at which the weight of the float 70 is transmitted to the valve 66, the valve is snapped into its closed position wherein it stops the further return of the oil to the crank case. As previously pointed out, closing of the valve is preferably effected when a small quantity of oil still remains in the tank so that the refrigerant is not permitted to flow into the crank case and there cause injury to the operating parts of the compressor. The separator and the mechanism within the tank 55 are entirely automatic in their operation and need no lubrication because of the fact that they come in contact with the oil which is removed from the refrigerant.

The refrigerating system which is disclosed herein is exceedingly efficient in operation in view of the fact that it comprehends the complete and efficient removal of oil from the refrigerant prior to passage of the refrigerant to the condenser. The centrifugal separator which is used to effect removal of the oil from the refrigerant consists of but a small number of parts and may be produced at a comparatively low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a refrigerating system, the combination with a motor-operated compressor for compressing the refrigerant for the system and an evaporating coil connected by a pipe line to receive compressed refrigerant from the compressor, of a separator device adapted to remove foreign liquid from the refrigerant prior to passage of the refrigerant to the coil and comprising a shell connected to the pipe line so that the refrigerant passes therethrough, a blade-equipped element mounted in the shell for rotation in response to flow of the refrigerant through said shell and operative during rotation to separate all foreign liquid from the refrigerant by flinging it outwardly, and means for catching the liquid flung outwardly by the blade-equipped element.

2. In a refrigerating system, the combination with a motor-operated compressor for compressing the refrigerant for the system and an evaporating coil connected by a pipe line to receive compressed refrigerant from the compressor, of a separator device adapted to remove foreign liquid from the refrigerant prior to passage of the refrigerant to the coil and comprising a cylindrical shell provided with side openings and arranged with respect to the pipe line so that the refrigerant passes longitudinally therethrough, a deflector mounted in the shell for rotation transversely thereof and having radially extending, angularly disposed blades whereby it is caused to rotate in response to passage of the refrigerant through the shell and all foreign liquid in suspension in the refrigerant is caused by centrifugal force to be thrown outwardly through the side openings in the shell, and a casing around the shell for catching the liquid that is flung or thrown outwardly through the side openings in the shell by the deflector.

3. In a refrigerating system, a circulating system including a condenser, an evaporator, an oil lubricated compressor for transferring refrigerant in gaseous form from said evaporator to said condenser, a device included in the circulating system between the compressor and condenser and a rotating element included in said device for intercepting oil passed into the circulating system by the compressor and for removing it from the gas stream by centrifugal force.

4. In a refrigerating system, a circulating system including a condenser, an evaporator, an oil lubricated compressor for transferring refrigerant in gaseous form from said evaporator to said condenser, a separator included in the circulating system between the compressor and condenser, a rotating element in said separator having blades against which the gas impinges as it passes from the compressor and on which oil escaping from the compressor accumulates, said blades being operative to impart a rotary motion to the accumulated oil and cause it to flow outwardly by centrifugal force, and a compartment in the separator for receiving the oil from said rotating element.

5. In a refrigerating system, a condenser, an evaporator, a compressor for transferring gaseous refrigerant from the evaporator to the condenser, and means in the path of the flowing gas for precipitating and removing foreign liquid suspended therein, said means including a rotating element on which the foreign liquid accumulates and over which it flows out of the gas stream by centrifugal force.

6. In a refrigerating system, a compressor, a closed circulating system through which said compressor forces refrigerant, the same being in the form of a gas in certain parts of the system and in liquid form in another part, a rotating element included in the system at a point where the refrigerant is a gas for accumulating foreign liquid suspended in the gas and for imparting a rotary movement to such liquid which removes it from the gas stream by centrifugal force, and a receptacle in which the liquid is received from said rotating element.

7. In a refrigerator, a circulating system including refrigerating elements and a refrigerant which at one stage of the refrigerating cycle is a gas, means for propelling the gaseous refrigerant from one part of the system to another part, an element located in the path of the flowing gas and rotated by impinging of the gas stream thereon, said element operative during rotation to intercept impurities present in the gas and impart to such impurities a rotary motion which moves them out of the gas stream by centrifugal force, and means for collecting such impurities and for preventing them from being again mixed with the refrigerant.

8. In a refrigerator, apparatus for liquefying and purifying a gaseous refrigerating substance, said apparatus comprising a condenser, a rotatable element operable by gas flow, a compressor adapted to force said gaseous substance past said element to said condenser at sufficient velocity to operate the element, said apparatus including means for properly confining the gas flow between said compressor and condenser, said element being effective during rotation to collect impurities from the gas and impart a rotary motion to such impurities which removes them from the gas stream by centrifugal force, and means for collecting said impurities and for preventing their return to the gas stream.

9. In a refrigerator, a circulating system including refrigerating elements and a refrigerant which in a portion of the system is in gaseous form, means for causing circulation of the refrigerant in said system, and a rotatable element included in said system at a point where the refrigerant is a gas and is circulating at high velocity, said element being operated responsive to flow of the refrigerant and being effective to intercept impurities from the refrigerant and accelerate such impurities in a direction which tends to remove them from the circulating refrigerant.

10. In a refrigerator, a circulating system containing a refrigerant which in one part of the system is a gas, there being a variable quantity of a foreign substance mixed with said refrigerant and held in suspension therein, rotatable elements included in the system at a point where the said refrigerant is a gas, means for propelling the gaseous refrigerant past said point at a sufficient velocity to operate said elements, the same allowing the gas to pass substantially unimpeded but operating to collect said foreign substance and impart a whirling motion thereto, whereby it is removed from the gas by centrifugal force.

JULIUS F. KOPSA.